(12) United States Patent
Kim

(10) Patent No.: US 8,743,311 B2
(45) Date of Patent: Jun. 3, 2014

(54) LIQUID CRYSTAL DISPLAY

(75) Inventor: Min-Ki Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

(21) Appl. No.: 13/454,182

(22) Filed: Apr. 24, 2012

(65) Prior Publication Data

US 2013/0148051 A1    Jun. 13, 2013

(30) Foreign Application Priority Data

Dec. 8, 2011    (KR) .................. 10-2011-0131186

(51) Int. Cl.
*G02F 1/1333*    (2006.01)

(52) U.S. Cl.
USPC .......................................... 349/58; 349/150

(58) Field of Classification Search
None
See application file for complete search history.

(56) References Cited

U.S. PATENT DOCUMENTS 7,385,664 B2 *  6/2008  Lee et al. ............... 349/149

FOREIGN PATENT DOCUMENTS

| KR | 10 2003-0043232 A | 6/2003 |
| KR | 10 2006-0089466 A | 8/2006 |
| KR | 10 2007-0076736 A | 7/2007 |
| KR | 10 2008-0010108 A | 1/2008 |
| KR | 10 2008-0010194 A | 1/2008 |
| KR | 10 2009-0055986 A | 6/2009 |

* cited by examiner

*Primary Examiner* — Richard Kim
(74) *Attorney, Agent, or Firm* — Lee & Morse, P.C.

(57) ABSTRACT

A liquid crystal display (LCD) including a display panel having a pixel for displaying an image; a backlight assembly for providing light to the display panel; a mold frame for receiving the backlight assembly; a chassis for supporting the display panel and the mold frame; and a ground tab between the mold frame and the chassis, the ground tab having elasticity and including a bent portion, the bent portion corresponding in shape to a bend in the chassis, and the ground tab overlying an upper surface and a side surface of the mold frame.

13 Claims, 4 Drawing Sheets

LIQUID CRYSTAL DISPLAY

RELATED APPLICATIONS

This application claims priority to and the benefit of Korean Patent Application No. 10-2011-0131186 filed in the Korean Intellectual Property Office on Dec. 8, 2011, the entire contents of which are incorporated herein by reference.

BACKGROUND

1. Field

The described technology relates generally to a liquid crystal display (LCD).

2. Description of the Related Art

A liquid crystal display (LCD) is one of the most widely used flat panel displays (FPD). An LCD includes two substrates on which electrodes are formed and a liquid crystal layer that is interposed therebetween, so that a voltage is applied to the electrodes to re-arrange the liquid crystal molecules of the liquid crystal layer and to thus control the amount of transmitted light.

The general liquid crystal display (LCD) includes a backlight assembly providing light to pass through the liquid crystal layer. The general backlight assembly includes a lamp, various sheets, and a receiver receiving them.

SUMMARY

One or more embodiments may provide a liquid crystal display (LCD) including a liquid crystal display (LCD) having a display panel including a pixel for displaying an image; a backlight assembly for providing light to the display panel; a mold frame for receiving the backlight assembly; a chassis for supporting the display panel and the mold frame; and a ground tab between the mold frame and the chassis, the ground tab having elasticity and including a bent portion, the bent portion corresponding in shape to a bend in the chassis, and the ground tab overlying an upper surface and a side surface of the mold frame.

An end of the chassis may include a chassis ground unit, and the bend in the chassis may be in the chassis ground unit. The chassis ground unit may contact a first portion and a second portion of the ground tab, the first and second portions intersecting at the bent portion. The chassis may have a protruding portion, the protruding portion being configured to push the ground tab against the mold frame. The ground tab may overly an edge of the mold frame. The edge of the mold frame may be thicker than a remainder of the mold frame.

The liquid crystal display (LCD) may further include a flexible printed circuit (FPC) between the mold frame and the chassis. The flexible printed circuit (FPC) may include an end having an FPC ground unit, the FPC ground unit corresponding in position to the chassis ground unit, and the ground tab is interposed between the FPC ground unit and the chassis ground unit. The FPC ground unit may include a groove, and the chassis ground unit may include a protruding portion extending within the groove. The bent portion may be curved.

DETAILED DESCRIPTION

Figure 1:
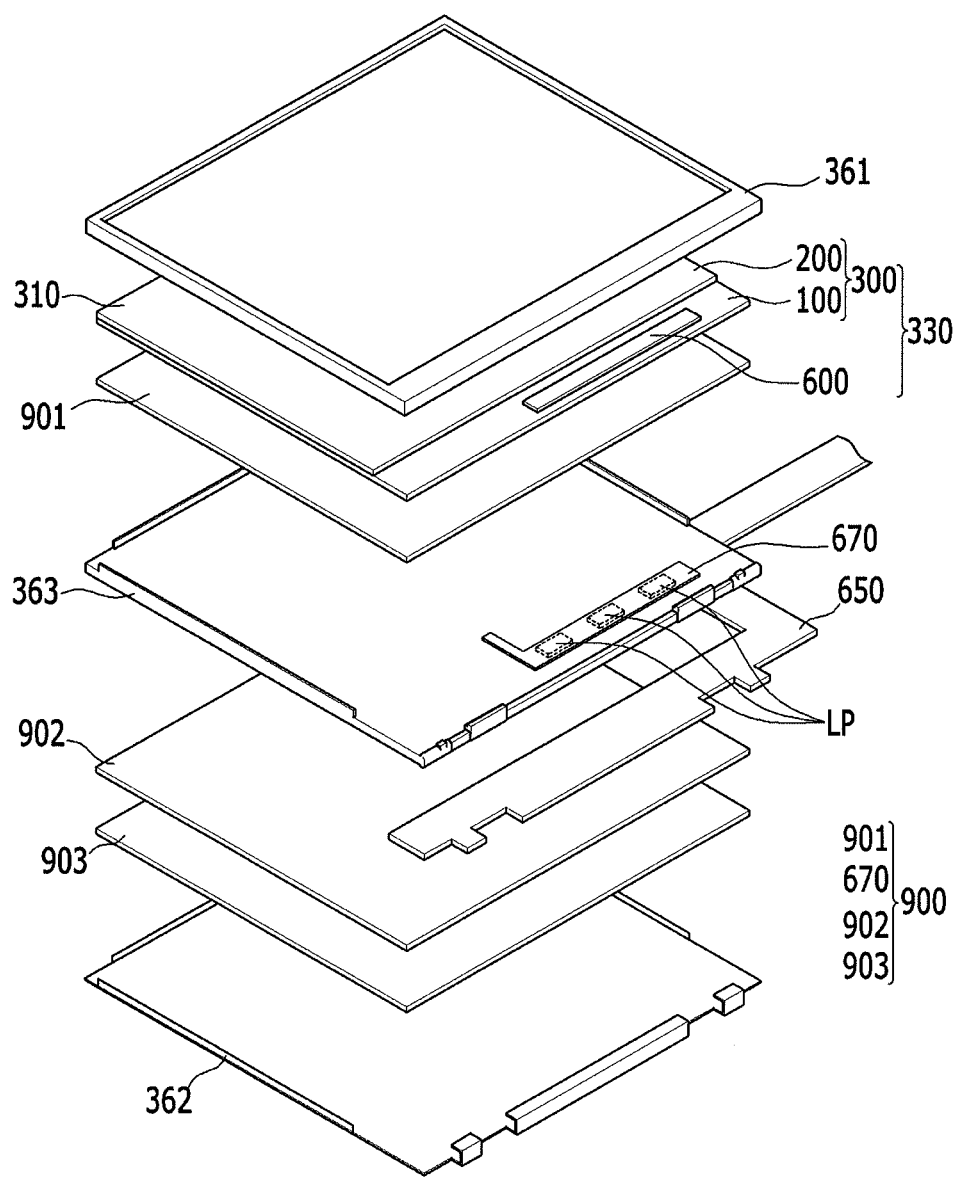
FIG. 1 illustrates an exploded perspective view of a liquid crystal display (LCD) according to an exemplary embodiment.

The embodiments will be described more fully hereinafter with reference to the accompanying drawings, in which exemplary embodiments are shown.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, a liquid crystal display (LCD) according to an exemplary embodiment will be described with reference to accompanying drawings.

Figure 2:
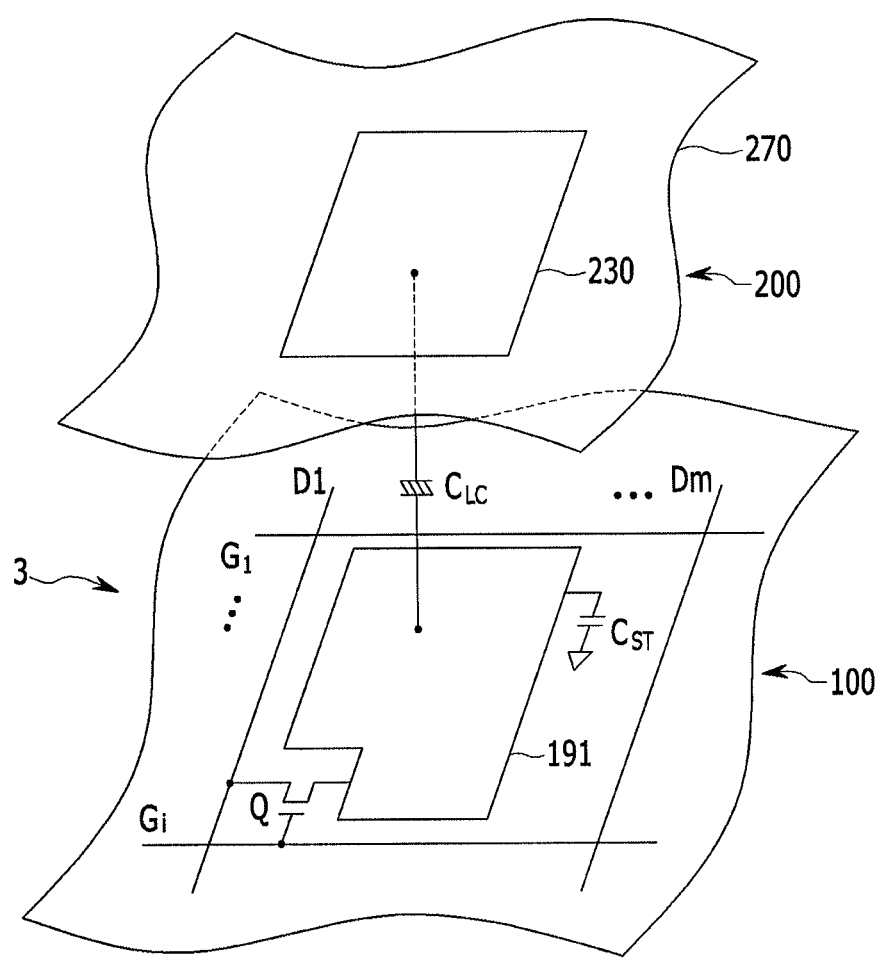
FIG. 2 illustrates an equivalent circuit of one pixel of a liquid crystal display (LCD) according to an exemplary embodiment.
Figure 3:
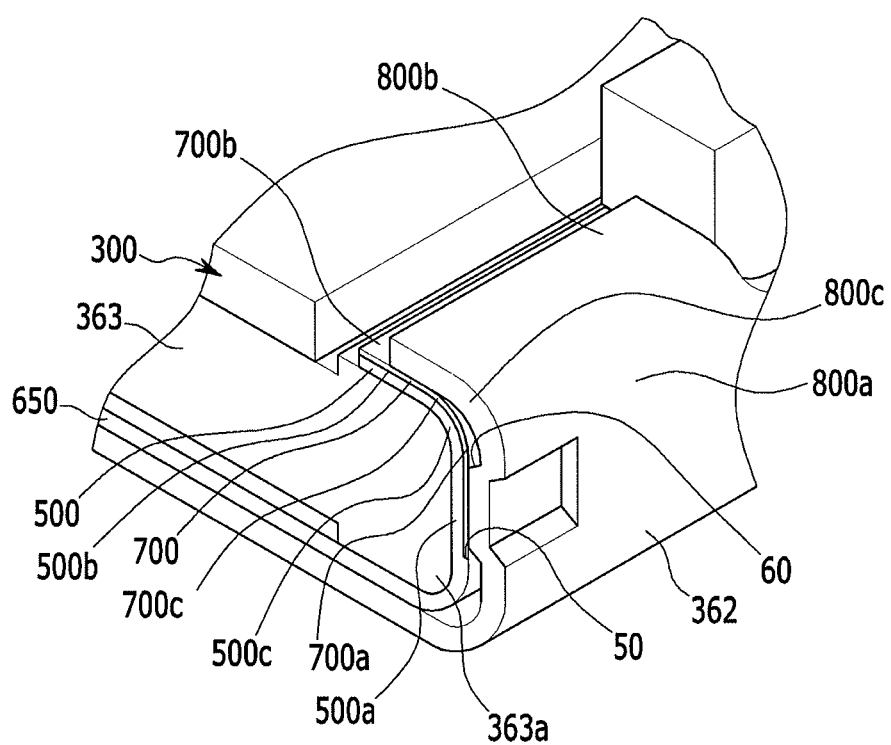
FIG. 3 illustrates a partial perspective view of a portion of FIG. 1.

FIG. 1 illustrates an exploded perspective view of a liquid crystal display (LCD) according to an exemplary embodiment. FIG. 2 illustrates an equivalent circuit of one pixel of a liquid crystal display (LCD) according to an exemplary embodiment. FIG. 3 illustrates a partial perspective view of a portion of FIG. 1.

As shown in FIG. 1, a liquid crystal display (LCD) according to an exemplary embodiment includes a liquid crystal module having a display panel 330 and a backlight unit 900. Upper and lower chassis 361 and 362 for receiving the liquid crystal module, a mold frame 363, and a flexible printed circuit (FPC) 650.

The display panel 330 includes a liquid crystal panel assembly 300 and a driving chip 600 mounted on the liquid crystal panel assembly 300.

Referring to FIG. 2, the liquid crystal panel assembly 300 includes a lower display panel 100 and an upper display panel 200, and a liquid crystal layer 3 interposed therebetween. A polarizer (not shown) for polarizing light is attached to at least one outer surface of the two display panels 100 and 200 of the liquid crystal panel assembly 300.

The liquid crystal panel assembly 300 includes a plurality of display signal lines including a plurality of gate lines $G_1$-$G_i$, and a plurality of data lines D1-Dm, and a plurality of pixels connected thereto and arranged in a substantial matrix, as well as a gate driver (not shown) for supplying a signal to the gate lines $G_1$-$G_i$. Most of the pixels and display signal lines $G_1$-$G_i$ and D1-Dm are positioned inside the display area 310.

The plurality of gate lines $G_1$-$G_i$ transmit a gate signal (referred to herein as "a scan signal") and the plurality of data lines D1-Dm transmit a data signal. The gate lines $G_1$-$G_i$ extend substantially in a first direction, e.g., a row direction, and are parallel to each other. The data lines D1-Dm extend substantially in a second direction, e.g., a column direction, and are parallel to each other. The first direction may be perpendicular to the second direction. Each pixel includes a switch Q connected to the display signal lines $G_1$-$G_i$ and D1-Dm, and a liquid crystal capacitor $C_{LC}$ and a storage capacitor $C_{ST}$ connected thereto. The storage capacitor $C_{ST}$ may be omitted if desired.

The switching element Q, e.g., a thin film transistor, is provided in the lower panel 100 and includes three terminals: a control terminal, an input terminal, and an output terminal.

The control terminal and the input terminal are connected to the gate lines $G_1$ to $G_i$ and the data lines D1 to Dm, respectively. The output terminal is connected to the liquid crystal capacitor $C_{LC}$ and the storage capacitor $C_{ST}$.

The liquid crystal capacitor $C_{LC}$ includes a pixel electrode 191 (of the lower display panel 100) and a common electrode 270 (of the upper display panel 200) which function as two terminals. The liquid crystal layer 3 between the pixel electrodes 191 and the common electrode 270 functions as a dielectric material. The pixel electrode 191 is connected to the switching element Q, and the common electrode 270 is formed on the entire surface of the upper display panel 200 and receives a common voltage Vcom from a common voltage generator (not shown). Alternatively, according to some embodiments, the common electrode 270 may be provided in the lower display panel 100, and at least one of the two electrodes 191 and 270 may be formed in a line shape or a bar shape.

The storage capacitor $C_{ST}$ includes overlapping portions of a separate signal line (not shown), the pixel electrode 191 (that is provided in the lower display panel 100), and an insulator interposed therebetween. A predetermined voltage, such as a common voltage Vcom, is applied to the separate signal line. However, according to some embodiments, the storage capacitor $C_{ST}$ may include overlapping portions of the pixel electrode 191, one of the gate lines $G_1$ to $G_i$ directly on the pixel electrode 191, and an insulator interposed therebetween.

Further, in order to represent color display, each pixel displays a color. For example, a color filter 230 of one of three primary colors of red, green, or blue, may be at a region corresponding to the position of the pixel electrode 191. In FIG. 2, the color filter 230 is formed in the upper display panel 200. According to some embodiments, however, the color filter 230 may be formed on or under the pixel electrode 191 of the lower display panel 100.

Again referring to FIG. 1, the backlight unit 900 is disposed within a peripheral edge of the mold frame 363 and includes a lamp LP (for supplying light to the liquid crystal panel assembly 300), a circuit element (not shown) for controlling the lamp LP, a flexible printed circuit (FPC) 670 mounted with the lamp LP, a light guide plate 902 (for guiding the light from the lamp LP to the liquid crystal panel assembly 300 and providing light of a uniform intensity), a reflecting sheet 903 provided under the light guide plate 902 (for reflecting the light from the lamp LP to the liquid crystal panel assembly 300), and a plurality of optical sheets 901 provided on the light guide plate 902 (for obtaining a luminescence characteristic of the light from the lamp LP).

The upper chassis 361 and the lower chassis 362 are respectively coupled to a lower side and an upper side of the mold frame 363 to form a housing within which the liquid crystal module 310 may be retained.

The upper chassis 361 and the lower chassis 362 may include a conductive material, and the mold frame 363 may include a plastic or a reinforced plastic material.

Referring to FIG. 3, the mold frame 363 includes an edge 363a. The edge 363a may have a greater thickness than a remainder of the mold frame 363. The flexible printed circuit 650 includes a ground unit (hereinafter referred to as a first ground unit) 500 that extends at least partially around the edge 363a. The first ground unit 500 may include a bent portion 500c between intersecting side and upper surfaces 500a and 500b of the ground unit 500. According to some embodiments, the first ground unit 500 of the flexible printed circuit 650 may contact the mold frame 363. A ground tab 700 is positioned between the mold frame 363, e.g., the edge 363a, and the lower chassis 362.

The first ground unit 500 of the flexible printed circuit (FPC) has a groove 50 that protrudes toward the mold frame 363. The first ground unit 500 is generally "C" shaped and encloses the edge 363a of the mold frame 363. The bent portion 500c may be rounded to conform to a shape of a bend in the edge 363a and the lower chassis 362. The first ground unit 500 contacts a side surface and an upper surface of the mold frame 363. For example, the side and upper surfaces 500a and 500b of the first ground unit 500 may contact a side surface and upper surfaces of the edge 363a.

The ground tab 700 may include a conductive material having elasticity, for example, a copper plate, and may include a bent portion 700c, corresponding in position to the bent portion 500c of the first ground unit 500. For example, the ground tab 700 may include a first portion 700a and a second portion 700b that extends from the first portion 700a. The first portion 700a and the second portion 700b may intersect, e.g., orthogonally. The first portion 700a and the second portion 700b may intersect at the bent portion 700c of the ground tab 700. The ground tab 700 contacts the upper surface 500b and the side surface 500a of the first ground unit 500. For example, the first portion 700a may contact the side surface 500a of the first ground unit 500 and the second portion 700b may contact the upper surface 500b of the first ground unit 500. The bent portion 700c of the ground tab 700 may be rounded or otherwise configured to correspond in shape with the bent portion 500c of the first ground unit 500.

The lower chassis 362 may include a second ground unit 800. The second ground unit 800 of the lower chassis 362 is generally C-shaped and includes a bent portion 800c between upper and side surfaces 800a and 800b of the second ground unit 800. The bent portion 800c corresponds in position with the bent portion 500c of the first ground unit and the bent portion 700c of the ground tab. The second ground unit 800 encloses, e.g., overlaps, the first ground unit 500 and the ground tab 700. Accordingly, the second ground unit 800 contacts the first portion 700a and the second portion 700b of the ground tab 700. The bent portion 800c of the second ground unit 800 may be rounded or otherwise configured to conform to the shape of the bend portion 500c of the first ground unit 500.

The second ground unit 800 has a protruding portion 60 that protrudes toward the groove 50. The protruding portion 60 is secured within the groove 50 such that the lower chassis 362 is prevented from being released from the ground tab 700.

Also, the protruding portion 60 pushes against the ground tab 700 such that the mold frame 363, the first ground unit 500, the ground tab 700, and the second ground unit 800 may be held together tightly.

As described above, the bent ground tab 700 is configured to provide increased contact area of the first ground unit 500 and second ground unit 800 with the ground tab 700. Accordingly, electrostatic force flowing to the lower chassis 362 may be stably discharged.

In the above exemplary embodiment, the liquid crystal display (LCD) including the groove 50 and the protruding portion 60 was described. However, as shown in FIG. 4, some embodiments may not include the protruding portion.

Figure 4:
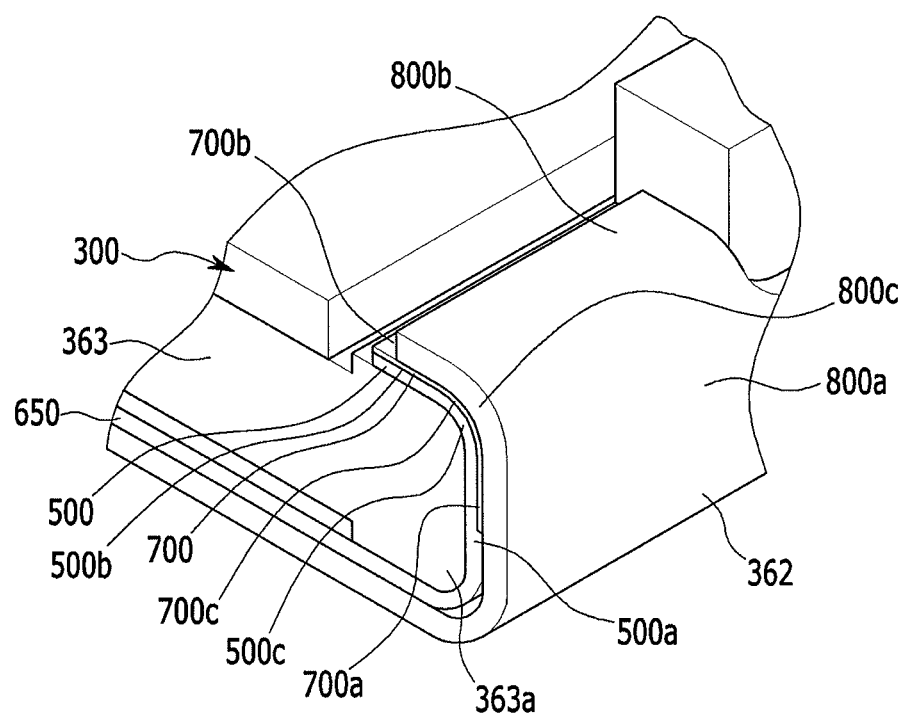
FIG. 4 illustrates an enlarged view of a portion of a liquid crystal display (LCD) according to another exemplary embodiment.

FIG. 4 illustrates an enlarged view of a liquid crystal display (LCD) according to another exemplary embodiment. Most of the components of the embodiments illustrated in FIG. 4 are the same as the embodiments illustrated in FIGS. 1 to 3, and only differences will be described in detail.

Referring to FIG. 4, the first ground unit 500 may include a bent portion 500c, which conform to a bend in the edge 363a of the mold frame 363. The ground tab 700 contacts the first ground unit 500. The second ground unit 800 contacts the ground tab 700.

As shown in FIG. 4, although the protruding portion is not formed, the first ground unit 500 and the second ground unit 800 contact the first and second portions 700a and 700b of the ground tab 700, such that the electrostatic force flowing to the lower chassis 362 may be stably discharged.

By way of summation and review, in the general high performance liquid crystal display (LCD) having an increased driving frequency band, an electrostatic shield has emerged as an important issue. For this electrostatic shield, a ground tab is installed between the module and the chassis to discharge the electrostatic. However, the ground tab contacts the chassis in a horizontal direction, and the ground contact is not stable because of a gap generated under the module assembly.

In contrast, one or more embodiments provide a liquid crystal display (LCD) that may stably discharge an electrostatic force by stably contacting a ground tab and a chassis. The ground tab contacts the upper surface and the side surface of the mold frame. As such, the contact area of the ground tab and the chassis is increased such that the electrostatic force flowing in the chassis may be effectively and stably discharged.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) comprising:
   a display panel including a pixel for displaying an image;
   a backlight assembly for providing light to the display panel;
   a mold frame for receiving the backlight assembly;
   a chassis for supporting the display panel and the mold frame; and
   a ground tab between the mold frame and the chassis, the ground tab having elasticity and including a bent portion, the bent portion corresponding in shape to a bend in the chassis, and the ground tab overlying an upper surface and a side surface of the mold frame.

2. The liquid crystal display (LCD) of claim 1, wherein:
   an end of the chassis includes a chassis ground unit, and
   the bend in the chassis is in the chassis ground unit.

3. The liquid crystal display (LCD) of claim 2, wherein the chassis ground unit contacts a first portion and a second portion of the ground tab, the first and second portions intersecting at the bent portion.

4. The liquid crystal display (LCD) of claim 3, wherein the chassis has a protruding portion, the protruding portion being configured to push the ground tab against the mold frame.

5. The liquid crystal display (LCD) of claim 1, wherein the ground tab overlies an edge of the mold frame.

6. The liquid crystal display (LCD) of claim 5, wherein the edge of the mold frame is thicker than a remainder of the mold frame.

7. The liquid crystal display (LCD) of claim 1, further including a flexible printed circuit (FPC) between the mold frame and the chassis.

8. The liquid crystal display (LCD) of claim 7, wherein:
   the flexible printed circuit (FPC) includes an end having an FPC ground unit, the FPC ground unit corresponding in position to the chassis ground unit, and
   the ground tab is interposed between the FPC ground unit and the chassis ground unit.

9. The liquid crystal display (LCD) of claim 8, wherein:
   the FPC ground unit includes a groove, and
   the chassis ground unit includes a protruding portion extending within the groove.

10. The liquid crystal display (LCD) of claim 1, wherein the bent portion is curved.

11. A liquid crystal display (LCD) comprising:
    a display panel including a pixel for displaying an image;
    a backlight assembly for providing light to the display panel;
    a mold frame for receiving the backlight assembly;
    a flexible printed circuit (FPC) including a first ground unit, the first ground unit having a groove;
    a chassis for supporting the display panel, the mold frame, and the FPC, the chassis including a second ground unit; and
    a ground tab between and contacting the first ground unit and the second ground unit, the ground tab having elasticity and including a bent portion, the bent portion corresponding in shape to bends in the first and second ground units, and the first ground unit, ground tab, and second ground unit overlying an upper surface and a side surface of the mold frame.

12. The liquid crystal display (LCD) of claim 11, wherein the first ground unit has a groove, and the second ground unit has a protrusion, and the groove is configured to receive the protrusion.

13. The liquid crystal display (LCD) of claim 12, wherein the protrusion and groove are coupled so as to maintain contact between each of the first and second units and the ground tab.

* * * * *